US012710531B2

(12) United States Patent
Ellis

(10) Patent No.: US 12,710,531 B2
(45) Date of Patent: Aug. 18, 2026

(54) VEHICULAR BLIND SPOT MONITORING SYSTEM WITH ENHANCED MONITORING ALONG CURVED ROAD

(71) Applicant: Magna Electronics Inc., Auburn Hills, MI (US)

(72) Inventor: Benjamin L. Ellis, Somerville, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 164 days.

(21) Appl. No.: 18/895,468

(22) Filed: Sep. 25, 2024

(65) Prior Publication Data

US 2025/0102667 A1 Mar. 27, 2025

Related U.S. Application Data

(60) Provisional application No. 63/585,228, filed on Sep. 26, 2023.

(51) Int. Cl.
*G01S 13/931* (2020.01)
*B60W 50/14* (2020.01)
*G06V 20/56* (2022.01)

(52) U.S. Cl.
CPC .......... *G01S 13/931* (2013.01); *B60W 50/14* (2013.01); *G06V 20/588* (2022.01); *B60W 2554/4049* (2020.02); *G01S 2013/9315* (2020.01)

(58) Field of Classification Search
CPC .......... G01S 13/931; G01S 2013/9315; G01S 13/867; B60W 50/14; B60W 2554/4049; G06V 20/588; G06V 20/58
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,786,772 | A | 7/1998 | Schofield et al. |
| 5,929,786 | A | 7/1999 | Schofield et al. |
| 5,949,331 | A | 9/1999 | Schofield et al. |
| 6,690,268 | B2 | 2/2004 | Schofield et al. |
| 6,824,281 | B2 | 11/2004 | Schofield et al. |
| 7,038,577 | B2 | 5/2006 | Pawlicki et al. |
| 7,480,149 | B2 | 1/2009 | DeWard et al. |
| 7,720,580 | B2 | 5/2010 | Higgins-Luthman |
| 7,855,755 | B2 | 12/2010 | Weller et al. |
| 7,881,496 | B2 | 2/2011 | Camilleri et al. |

(Continued)

*Primary Examiner* — Daryl C Pope
(74) *Attorney, Agent, or Firm* — HONIGMAN LLP

(57) ABSTRACT

A vehicular sensing system, responsive to processing image data captured by a forward-viewing camera at a first time, generates a first set of lane geometries representing curvature and location of a portion of at least one traffic lane of a road respective to a first position of the equipped vehicle at the first time. The vehicular sensing system, via processing motion data representative of motion of the equipped vehicle, tracks the first set of lane geometries. Based on processing of the motion data and the tracked first set of lane geometries, the vehicular sensing system generates a second set of lane geometries representing the curvature and location of the portion of the at least one traffic lane respective to a second position of the vehicle at a second time. The vehicular sensing system determines a blind zone based on the generated second set of lane geometries.

29 Claims, 5 Drawing Sheets

(56) References Cited

U.S. PATENT DOCUMENTS 8,013,780 B2 9/2011 Lynam
8,027,029 B2 9/2011 Lu et al.
8,256,821 B2 9/2012 Lawlor et al.
9,036,026 B2 5/2015 Dellantoni et al.
9,146,898 B2 9/2015 Ihlenburg et al.
9,487,159 B2 11/2016 Achenbach
9,596,387 B2 3/2017 Achenbach et al.
9,871,971 B2 1/2018 Wang et al.
9,896,039 B2 2/2018 Achenbach et al.
9,954,955 B2 4/2018 Davis et al.
10,046,706 B2 8/2018 Larson et al.
10,071,687 B2 9/2018 Ihlenburg et al.
10,099,614 B2 10/2018 Diessner
10,407,047 B2 9/2019 Chundrlik, Jr. et al.
10,442,360 B2 10/2019 LaCross et al.
12,384,462 B2 * 8/2025 Honda ................ B60W 40/072
2009/0295181 A1 12/2009 Lawlor et al.
2014/0160284 A1 6/2014 Achenbach et al.
2014/0226012 A1 8/2014 Achenbach
2015/0015713 A1 1/2015 Wang et al.
2015/0327398 A1 11/2015 Achenbach et al.
2017/0254873 A1 9/2017 Koravadi
2017/0276788 A1 9/2017 Wodrich
2017/0356994 A1 12/2017 Wodrich et al.
2018/0015875 A1 1/2018 May et al.
2018/0237008 A1 * 8/2018 Matsumura ....... B60W 30/0956
2019/0118717 A1 4/2019 Blank et al.
2019/0339382 A1 11/2019 Hess et al.
2020/0039447 A1 2/2020 Winden
2021/0155167 A1 5/2021 Lynam et al.
2021/0162926 A1 6/2021 Lu
2021/0245662 A1 8/2021 Blank et al.
2024/0064274 A1 2/2024 Blank et al.
2024/0174226 A1 * 5/2024 Tsukuda ................ B60W 30/12
2024/0253622 A1 8/2024 Awathe et al.
2024/0317256 A1 9/2024 Kim et al.

* cited by examiner

VEHICULAR BLIND SPOT MONITORING SYSTEM WITH ENHANCED MONITORING ALONG CURVED ROAD

CROSS REFERENCE TO RELATED APPLICATION

The present application claims the filing benefits of U.S. provisional application Ser. No. 63/585,228, filed Sep. 26, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular sensing system includes a forward-viewing camera disposed at a vehicle equipped with the vehicular sensing system and viewing at least forward of the equipped vehicle and capturing image data. The forward-viewing camera includes a CMOS imaging array that includes at least one million photosensors arranged in rows in columns. The vehicular sensing system includes an electronic control unit (ECU) that includes electronic circuitry and associated software. Image data captured by the forward-viewing camera is transferred to the ECU. The electronic circuitry of the ECU includes an image processor that is operable to process image data captured by the forward-viewing camera. Responsive to processing at the ECU of image data captured by the forward-viewing camera at a first time, the vehicular sensing system generates a first set of lane geometries representing curvature and location of a portion of at least one traffic lane of a road along which the equipped vehicle is traveling respective to a first position of the equipped vehicle at the first time. The portion of the at least one traffic lane is located forward of the equipped vehicle at the first position. The vehicular sensing system tracks the first set of lane geometries via processing motion data representative of motion of the equipped vehicle traveling along the road after the first time. Based on the motion data and the tracked first set of lane geometries, the vehicular sensing system generates a second set of lane geometries representing curvature and location of the portion of the at least one traffic lane of the road respective to a second position of the equipped vehicle at a second time. The portion of the at least one traffic lane is located rearward of the equipped vehicle at the second position. The vehicular sensing system determines a blind zone of the equipped vehicle based on the generated second set of lane geometries.

These and other objects, advantages, purposes and features of the present invention will become apparent upon review of the following specification in conjunction with the drawings.

DESCRIPTION OF THE PREFERRED EMBODIMENTS

A vehicle sensing system and/or driver or driving assist system and/or object detection system and/or alert system operates to capture sensing data exterior of the vehicle and may process the captured data to detect objects at or near the vehicle and in the predicted path of the vehicle, such as to assist a driver of the vehicle in maneuvering the vehicle in a forward or rearward direction. The system includes a processor that is operable to process sensor data that is transferred to the processor from one or more sensors (e.g., radar sensors, lidar sensors, ultrasonic sensors, etc.) and provide an output, such as an alert or control of a vehicle system.

Figure 1:
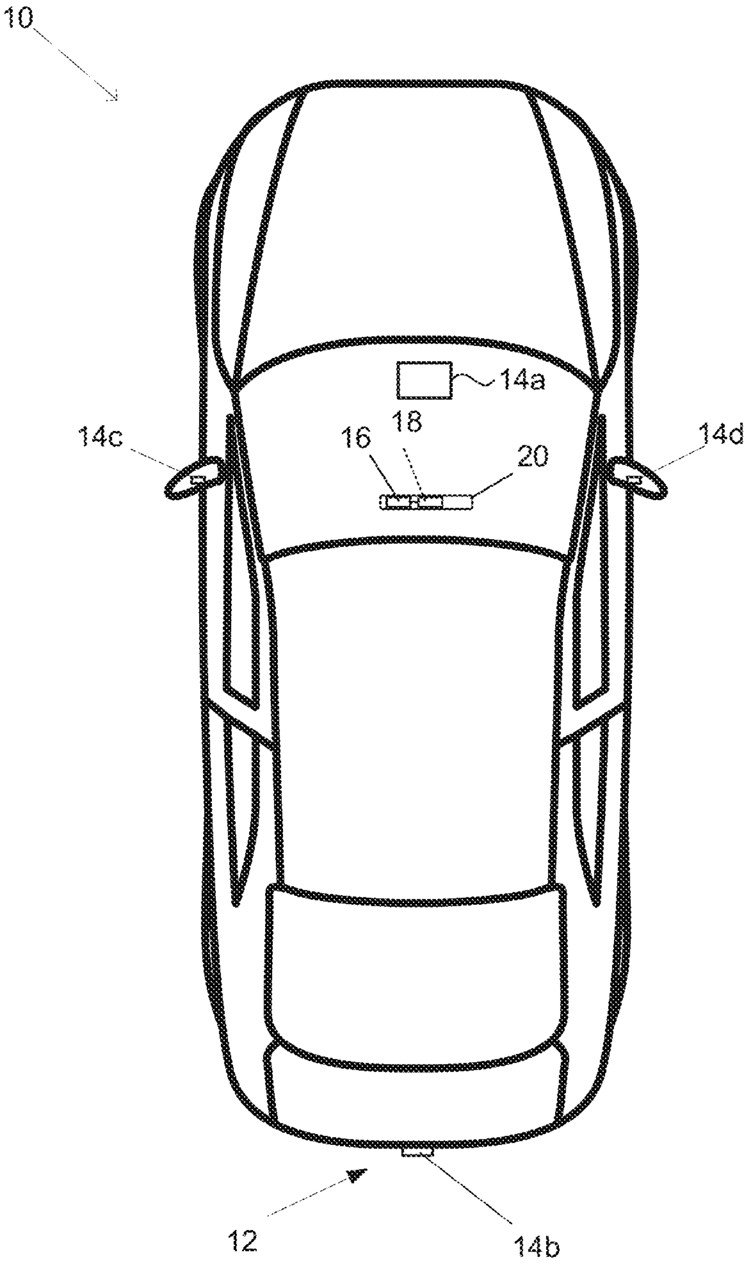
FIG. 1 is a plan view of a vehicle with a vision system that incorporates cameras.

Referring now to the drawings and the illustrative embodiments depicted therein, a vehicle 10 (FIG. 1) includes a sensing system or driving assist system or vision system 12 that includes at least one exterior viewing imaging sensor or camera, such as a forward viewing imaging sensor or camera 14*a* (e.g., disposed at the windshield of the vehicle and viewing at least forward of the vehicle through the windshield), which captures images exterior of the vehicle, with the camera having a lens for focusing images at or onto an imaging array or imaging plane or imager of the camera (FIG. 1). Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, the system may include multiple exterior viewing imaging sensors or cameras, such as a rearward viewing camera 14*b* (such as a rear backup camera), and sideward/rearward viewing camera 14*c*, 14*d* at respective sides of the vehicle. The sensing system 12 may include multiple exterior sensing sensors, such as radar, lidar, or other sensors, such as a rearward sensing sensor at the rear of the vehicle, and a sideward/rearward sensing sensor at respective sides of the vehicle), which sense regions exterior of the vehicle. The sensing system 12 includes a control or electronic control unit (ECU) 18 having electronic circuitry and associated software, with the electronic circuitry including a data processor or image processor that is operable to process image data captured by the camera or cameras or other sensors, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Blind spot monitoring refers to an Advanced Driver Assistance System (ADAS) feature that alerts a driver of the equipped vehicle if there is another vehicle in a blind spot of the equipped vehicle (the area sideward and rearward at either side of the vehicle where a driver of the vehicle may not clearly view due to mirror adjustment or obstruction) or if the other vehicle is quickly approaching the blind spot of the equipped vehicle. However, the blind spot monitoring feature should not alert the driver if the other vehicle is in the same lane as the equipped vehicle or is further away than a lane that is directly adjacent to the lane that the equipped vehicle is traveling upon. For example, the blind spot monitoring feature should not alert the driver of another vehicle that is traveling along a left-most traffic lane that is two traffic lanes over from a right-most lane the equipped vehicle is traveling along in a three-lane road scenario.

Thus, to perform optimally, the system needs to be aware of the shape or curvature of the traffic lanes around the equipped vehicle to determine whether other vehicles are in traffic lanes directly adjacent to the traffic lane the equipped vehicle is traveling along. Yet, many current approaches simply assume that the traffic lanes around the equipped vehicle are straight. This simplified assumption can cause the blind spot monitoring feature to inaccurately classify a traffic lane that the equipped vehicle is currently driving upon to be an adjacent lane or inaccurately classify a traffic lane that is not directly adjacent to the equipped vehicle (i.e., two or more lanes over from the equipped vehicle) as directly adjacent to the equipped vehicle. That is, while the assumption that the lanes around the equipped vehicle are straight simplifies the implementation of the blind spot monitoring feature, it degrades performance of the feature for curved roads.

Figure 2:
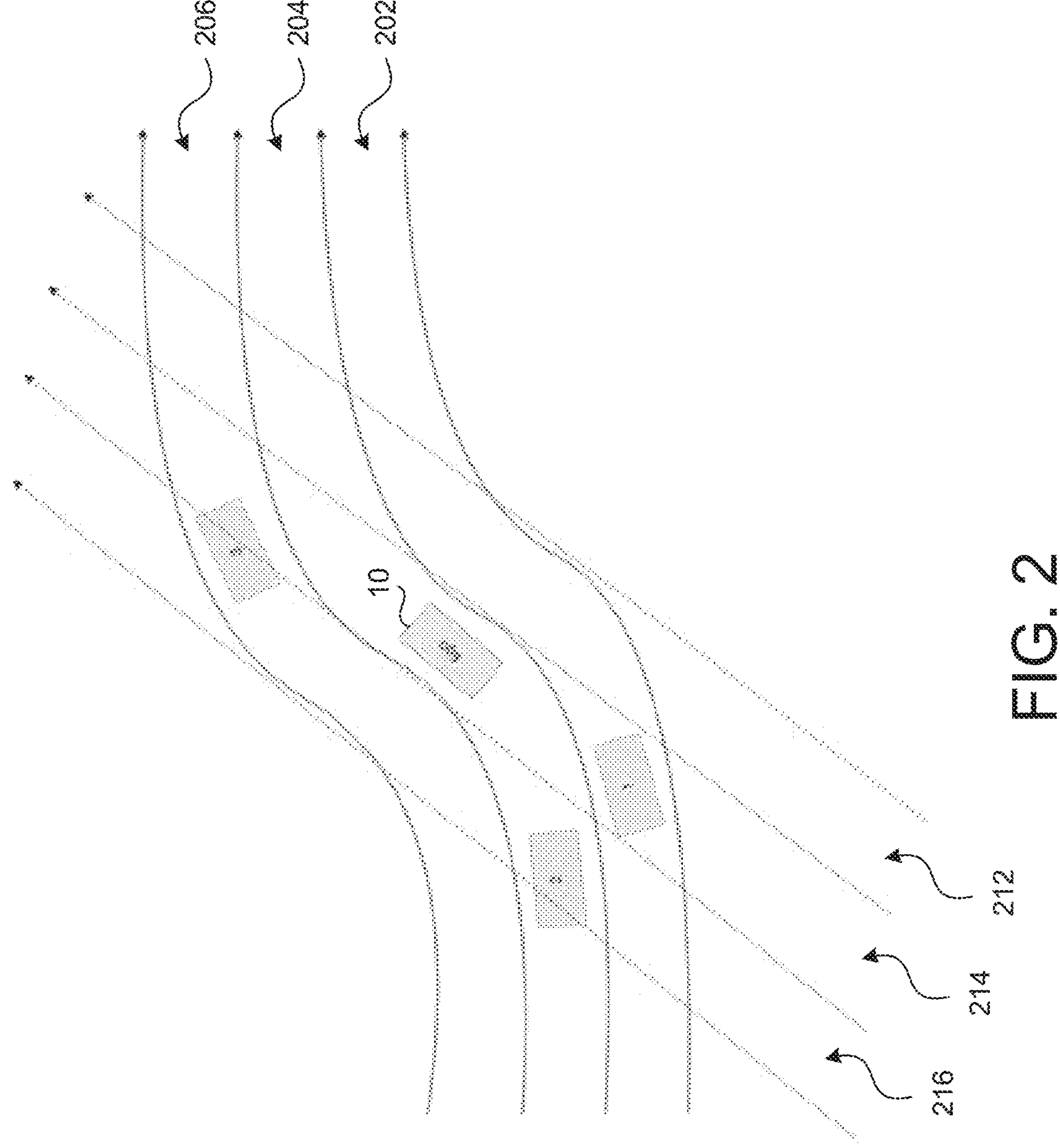
FIG. 2 is a schematic view of an equipped vehicle in a curved road scenario using a straight lane assumption for blind spot monitoring.

FIG. 2 depicts a result of the straight lane assumption in a curved lane scenario where the lanes 202, 204, 206 shown with solid lines are the actual lanes of the road, and the lanes 212, 214, 216 shown with straight dashed lines are the assumed straight lanes that correspond to the curved solid lanes 202, 204, 206 at a particular location along the curve of the road. Here, the actual lanes 202, 204, 206 of the road are curved such that the assumed straight lanes 212, 214, 216 do not accurately reflect the road the vehicle is traveling along. In the example shown, a first surrounding vehicle or object is present in the right lane 202, a second surrounding vehicle or object is present in the center lane 204 behind the equipped vehicle 10, and a third surrounding vehicle or object is present in the left lane 206. As a result, despite the first vehicle being in the right lane 202 adjacent to the equipped vehicle, the equipped vehicle 10 may incorrectly classify the first vehicle as being in the incorrectly assumed straight middle lane 214 that the equipped vehicle 10 is traveling upon. Similarly, despite the second vehicle being in the same center lane 204 as the equipped vehicle 10, the equipped vehicle 10 may incorrectly classify the second vehicle as being in the incorrectly assumed left middle lane 216 adjacent to the assumed lane 214 the equipped vehicle 10 is traveling along. This assumption may be acceptable in some scenarios such as on the highway, however, the assumption may not be acceptable for back roads or town roads. To address this weakness, current systems using the blind spot monitoring feature declare that the feature is not intended to be used (i.e., the feature is temporarily disabled) for roads that have strong curvature. However, keeping the blind spot monitoring feature enabled for curved roads can provide a useful benefit for drivers if the feature accurately identifies other vehicles in the blind spots of the equipped vehicle.

Implementations herein include a vehicular sensing system or vehicular deriving assist system 12 that accurately performs blind spot monitoring as the equipped vehicle travels along roads including straight roads and curved roads. Advantageously, the vehicular vision system continues to operate as the equipped vehicle travels along roads that have strong curvature thereby eliminating the need to temporarily disable the blind spot monitoring feature. The system generates a geometric model of what the lanes around the equipped vehicle look like and incorporates the generated lane geometry into the system for triggering an alert to the driver. More specifically, the system generates the geometric model by amalgamating lane lines from a front camera (e.g., the forward imaging sensor 14*a*) of the equipped vehicle that is capable of lane detection capability. The system uses radar or lidar sensors to detect whether other vehicles are in or approaching blind spots of the equipped vehicle based on the geometric model of the lane lines.

Many camera systems used in modern vehicles with ADAS features are capable of performing lane detection using computer vision techniques. Here, the computer vision techniques identify information from a video feed of the camera system to discern the environment around the vehicle by using conventional and machine learning (i.e., convolutional neural network (CNN)) approaches. A forward camera system will generate a shape or orientation or curvature of lane markers or lines in front of the equipped vehicle (e.g., the current lane the vehicle is traveling upon and lanes adjacent to the current lane) as polynomials and, for each iteration cycle of a plurality of iteration cycles, generate a new set of polynomials for the lane lanes in front of the equipped vehicle during the current iteration cycle. Here, the iteration cycles may occur according to a predetermined frequency, for example, based on the camera capturing frames of image data at, for example, 30 frames per second, or 60 frames per second, or 120 frames per second, etc.

The blind spot monitoring feature performs a blind spot occupancy check and reports whether there is another vehicle in, or approaching, a blind spot zone of the equipped vehicle. Here, blind spot zones refer to areas around the equipped vehicle that cannot be seen by the driver even when checking rearview mirrors and/or exterior side view mirrors. In conventional systems that assume that all the lanes are straight, the blind spot zones may be geometric shapes, for example, rectangles, adjacent to and sideward and rearward of the equipped vehicle. The blind spot monitoring feature receives the location of surrounding vehicles and determines whether any surrounding vehicles are in the blind spot zones of the equipped vehicle. When the blind spot monitoring feature determines a surrounding vehicle is in the blind spot zone of the equipped vehicle, the system alerts the driver. The alert may include a light illuminating on one or more side view mirrors, a graphical alert via a head-up display (HUD) or graphical user interface, haptic feedback (e.g., vibrating a steering wheel and/or seat of the equipped vehicle), and/or an audible alert. The blind spot monitoring feature may receive the location of surrounding vehicles from an obstacle tracking component of a perception stack that also runs on a processor for the ADAS. For example, radar sensors and/or lidar sensors may capture sensor data that the system processes to determine the presence of other vehicles at or near the equipped vehicle. Additionally, the blind spot monitoring feature performs a speed calculation and determines how quickly the surrounding vehicles are approaching the blind spot zone. If the time it would take for the surrounding vehicles to enter the blind spot zone is below a specified threshold, the system will alert the driver.

There are two main steps of the vehicular vision system, namely, generating a lane geometry model and using the generated lane model to improve the reliability of the blind spot monitoring feature. One major obstacle of generating the lane model is that most ADAS equipped vehicles have a forward-viewing camera system with lane detection capabilities, however, it is not common to have sideward-viewing cameras and/or rearward-viewing cameras with the same lane detection capabilities (i.e., the image processor(s) that process the image data captured by these cameras is not configured to perform lane detection). That is, the forward-viewing camera system may only view forward of the vehicle and not view sideward or rearward of the vehicle. As the blind spot zones are located to the side and rear of the equipped vehicle, the shape or curvature of the lanes may need to be indirectly determined because they cannot be directly observed. That is, due to the lack of sideward-viewing cameras and rearward-viewing cameras with lane detection capabilities, the shape or curvature of the lanes behind the equipped vehicle cannot be directly perceived.

To that end, the vehicular vision system recognizes that lane geometries currently in front of the equipped vehicle will soon be behind the equipped vehicle, including the blind spot zones of the equipped vehicle. As such, the system generates a lane history based on the lane geometries currently in front of the equipped vehicle. For example, at an initial time while the vehicle is traveling along a road, a first set of lane lines are converted to piecewise linear functions with nodes converted into ego coordinates (e.g., equipped vehicle coordinates) forming the lane history according to:

$$L(x) = \{l_i(x) \text{ if } x_i < x < x_{i+1}\} \tag{1}$$

Thereafter, at the next iteration cycle of the system, the previous lane history is propagated using motion data or information of the equipped vehicle and the next set of lane lines are converted into piecewise linear function in the ego coordinates. The next set of lane lines are then overlaid onto and added to the existing lane history. Linear segments that are very far behind the equipped vehicle (e.g., exceed a threshold distance), are no longer relevant to blind spot detection feature and may be discarded. Determining the lane history in this manner provides a moving window of piecewise linear lane geometries.

Figure 3:
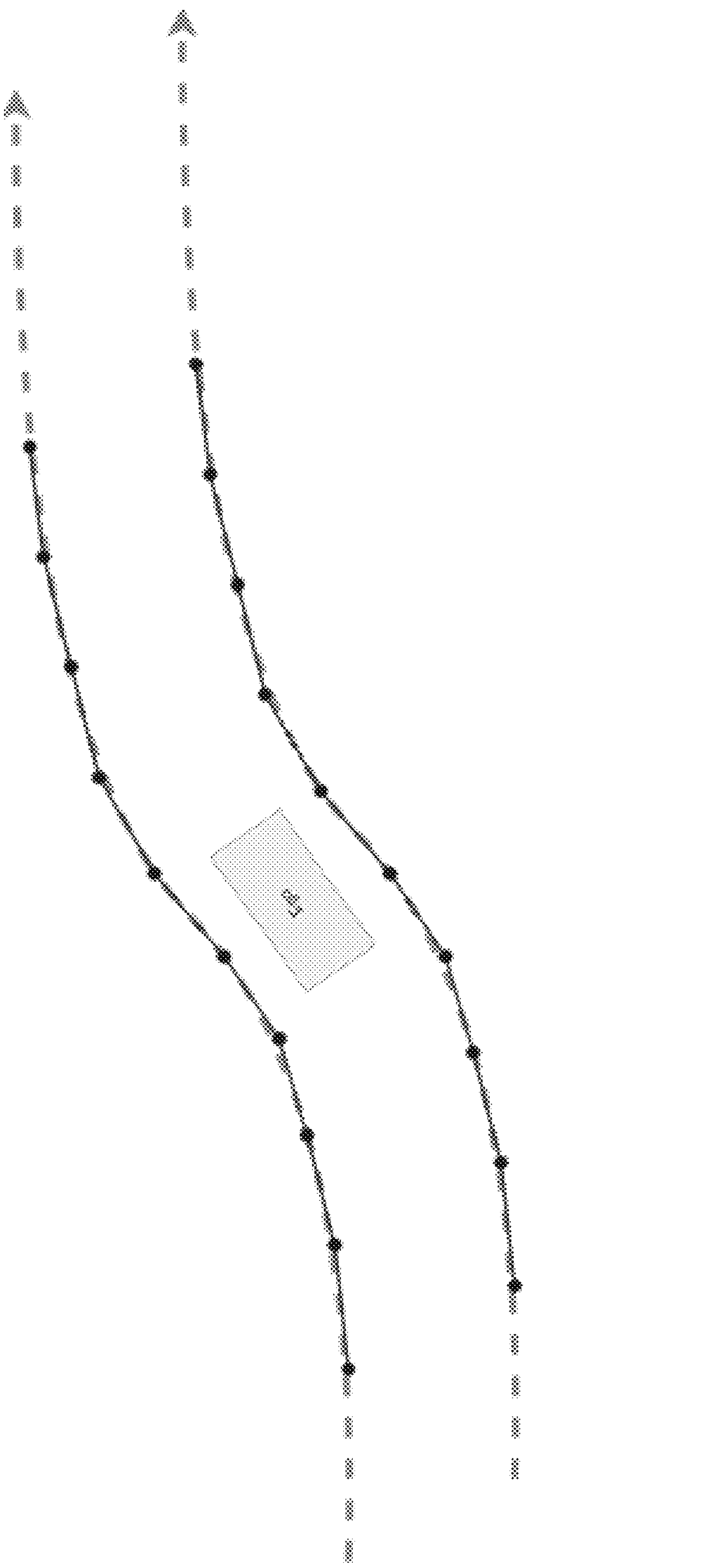
FIG. 3 is a schematic view of a piecewise linear representation of a lane line geometry.

Previous lane lines in the lane history and new lane lines will not match exactly due to various noise factors. Thus, where two lane line geometries overlap, the system determines an average of the two piecewise linear functions to address the previous lane lines and new lane lines not matching exactly as shown in FIG. 3. The extent to which new lane lines are trusted over old lane lines in the lane history can be tuned with a filter parameter. For example, two linear piecewise functions corresponding to a lane line in the lane history and a new lane line may be represented by:

$$L(x) = \{l_i(x) \text{ if } x_i < x < x_{i+1}\} \tag{2}$$

$$K(x) = \{k_j(x) \text{ if } x_j < x < x_{j+1}\} \tag{3}$$

The two linear piecewise functions from Equations 2 and 3, may be subdivided such that the two linear piecewise functions use a same set of control points $\{x_n\}$. Thus, the system may control the extent to which new lane lines are trusted over old lane lines using the filter parameter according to:

$$\alpha L(x) + (1-\alpha)K(x) = \{\alpha l_n(x) + (1-\alpha)k_n(x) \text{ if } x_n < x < x_{n+1}\} \tag{4}$$

Figure 4:
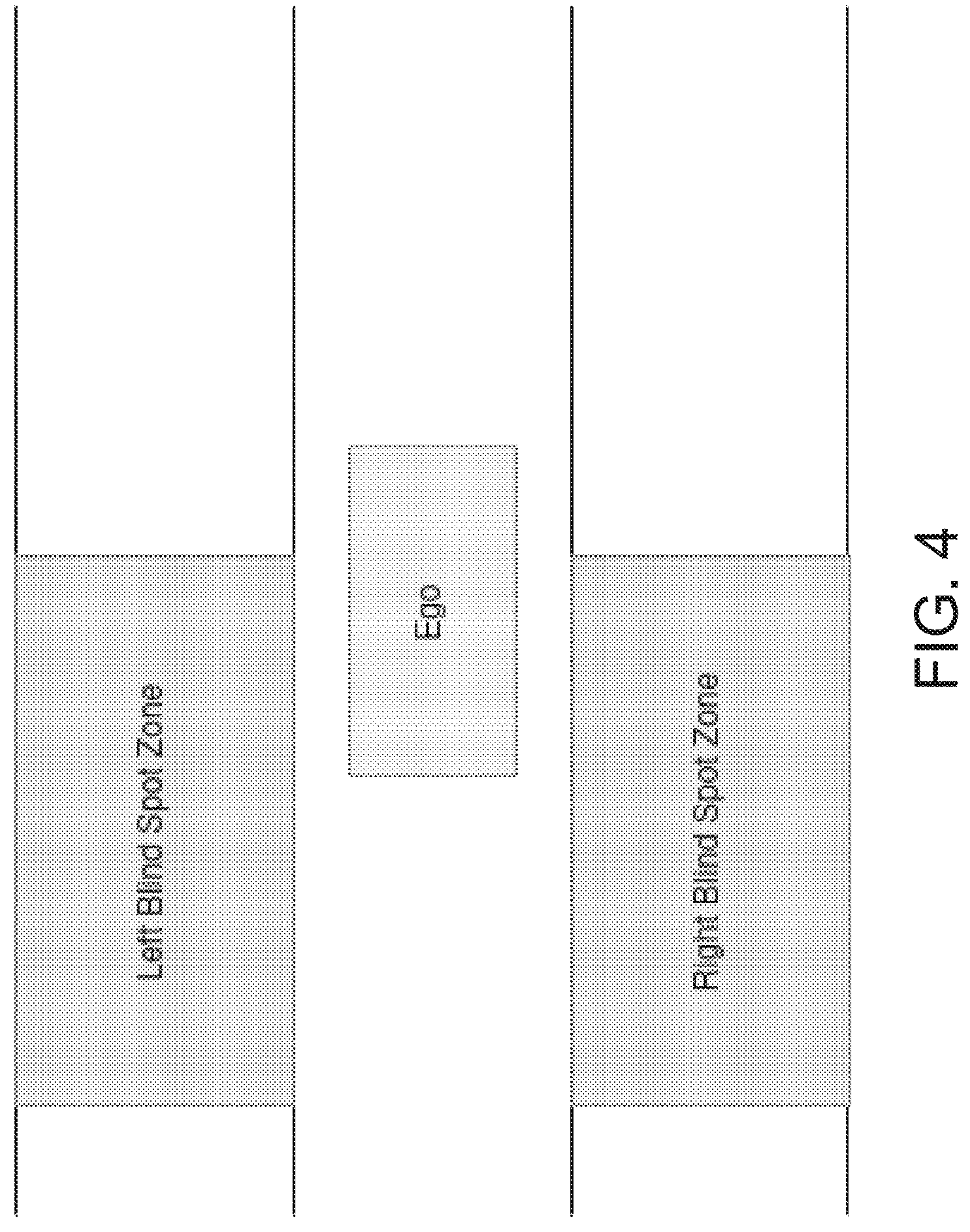
FIG. 4 is a schematic view of standard blind spot zones using a straight line assumption.

After generating the lane geometry history, the blind spot monitoring feature logic can be adapted to be non-linear. For example, FIG. 4 shows the straight lane assumption approach where the blind spot zones are simple rectangles. Here, the blind spot monitoring feature first detects (i.e., using one or more sideward/rearward viewing imaging sensors or radar sensors or lidar sensors) whether any obstacles are in the adjacent lane using a lateral test, and then detects whether the obstacle is close enough to a rear-side of the equipped vehicle using a longitudinal test. Breaking up the rectangle inclusion into these two separate tests simplifies the transition to the non-linear adaptation.

Figure 5:
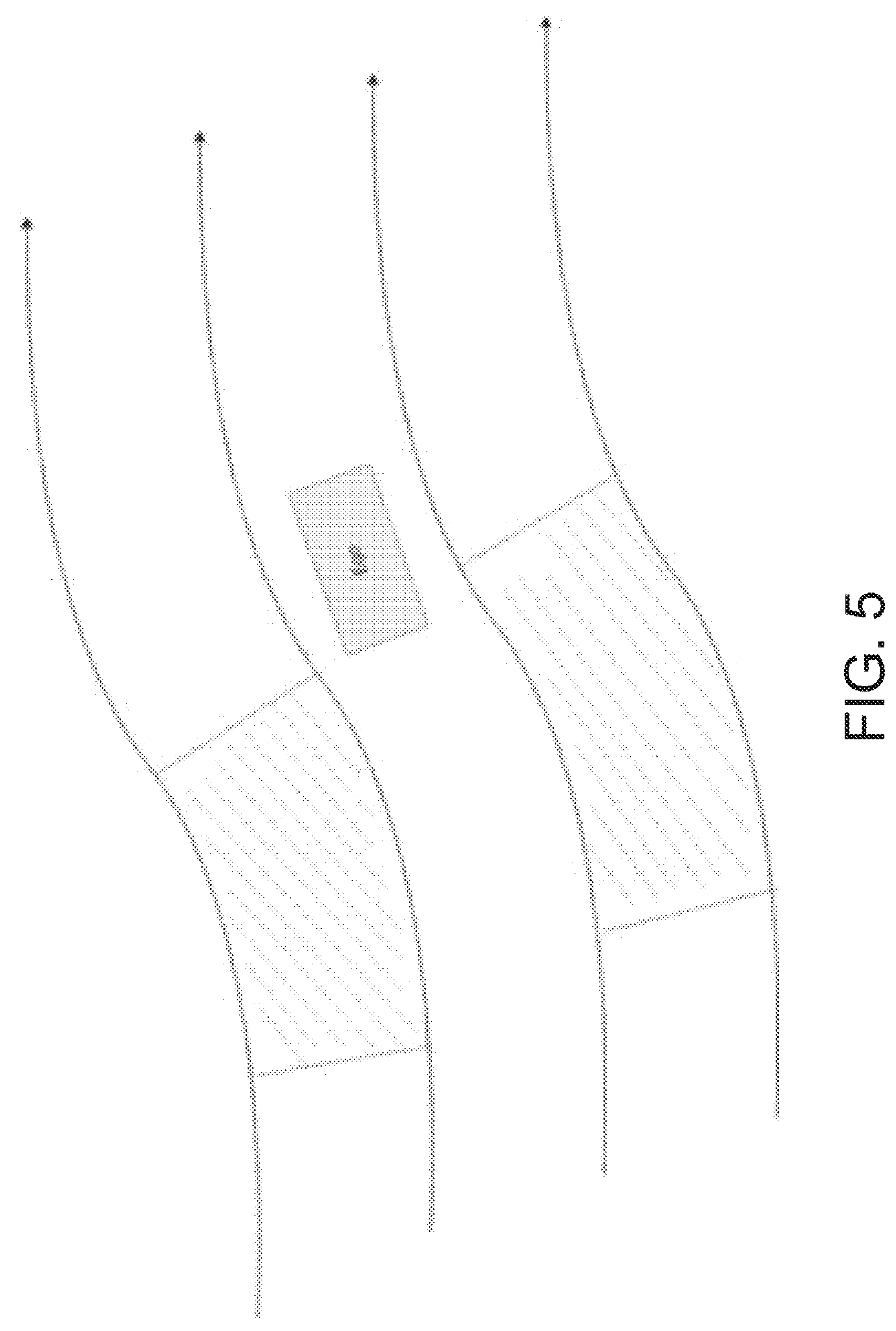
FIG. 5 is a schematic view of curved blind spot zones generated from a lane geometry history.

That is, in the proposed approach, the blind spot zones may be non-linear rectangles as shown in FIG. 5. Here, the blind spot zones may be non-linear such that they conform to the curved or non-linear lanes of the road the vehicle is traveling along. Thus, the lateral test becomes an over-under curve test rather than a simple lateral distance test. The system determines the over-under curve test from the piecewise linear function by checking the sign of a tested point according to:

$$L(x_0) - y_0 > 0 \tag{5}$$

In Equation 5, $(x_0, y_0)$ represents the tested point. Moreover, the longitudinal test checks the distance behind the equipped vehicle along the lane geometry path. This amounts to a projection of the test point onto the lane geometry. Thereafter, the blind spot monitoring feature determines the distance along the lane line from the projected point to the side of the equipped vehicle. As a result of using piecewise linear functions, the distance (from $x_n$ to $x_m$) is a sum represented by:

$$\sum_{i=n}^{m-1} \frac{l_i(x_i) + l_{i+1}(x_{i+1})}{2}(x_{i+1} - x_i) \tag{6}$$

Thus, with the generalized lateral and longitudinal tests, the rest of the blind spot monitoring logic remains the same.

Accordingly, the vehicular sensing system 12 may include the forward-viewing camera 14*a* viewing exterior of a front of the equipped vehicle 10 capturing image data. In some examples, the forward-viewing camera only views forward of the vehicle. The vehicular sensing system may also include radar and lidar sensors sensing exterior of the vehicle (e.g., forward, rearward, and/or sideward of the vehicle). The vehicle may be traveling along a road with at least one traffic lane. The road may be a curved with that has multiple curved traffic lanes. The ECU processes image data representing a portion of the at least one traffic lane of the road as captured by the forward-viewing camera at a first time. At the first time, the portion of the at least one traffic lane is forward of the equipped vehicle with the equipped vehicle at a first position. That is, the portion of the at least one traffic lane is located forward of the equipped vehicle with respect to the first position the equipped vehicle is at during the first time. Since the portion of the at least one traffic lane is located forward of the equipped vehicle, the forward-viewing camera directly observes the portion of the at least one traffic. Thus, the vehicular sensing system generates, at a first iteration corresponding to the first time, a set of lane line geometries representing a shape or curvature and location of the portion of the at least one traffic lane using the image data captured by the forward-viewing camera.

However, at a second time occurring after the first time, the equipped vehicle has continued traveling upon the road such that the equipped vehicle is now at a second position along the road during the second time. Thus, the portion of the at least one traffic lane is now located rearward of or adjacent to the equipped vehicle with respect to the second position of the equipped vehicle. Thus, image data captured by the forward-viewing camera only captures new lane line indicators (now forward and in range of the forward-viewing camera) and does not capture the prior lane line indicators. That is, the portion of the at least one traffic lane is now out of a field of view of the forward-viewing camera. Notably, the equipped vehicle may not include other imaging sensors facing or viewing or sensing sideward/rearward such that the equipped vehicle cannot directly observe the prior lane line indicators. Accordingly, the vehicular vision system cannot rely on image data to determine the shape or orientation and location of the prior lane line indicators when the equipped vehicle is at the second position. Yet, the equipped vehicle still needs to understand the location and shape or curvature of the surrounding lanes located behind the vehicle to accurately determine its blind spot zones.

As such, at a second iteration corresponding to the second time, the vehicular vision system processes motion data indicating motion of the equipped vehicle traveling along the road between the first point in time and the second point in time to estimate an updated set of lane line geometries. The motion data may include a velocity, acceleration, deceleration, steering angle, pitch, yaw, roll, of the equipped vehicle between the first point in time and the second point in time. As such, the vehicular vision system processes the motion data to determine a relative location between the equipped vehicle and the previously generated set of lane line geometries. The system or ECU may fuse the motion data with the captured image data to track the lane markers and traffic lane from the first point in time to the second point in time. Stated differently, the vehicular vision system estimates an updated set of lane line geometries representing the portion of the at least one traffic lane previously captured by the forward-viewing camera, respective to the second position of the equipped vehicle. Simply put, the updated lane line geometries represent the shape or curvature and location of the portion of the at least one traffic lane relative to the equipped vehicle at the second position even though the equipped vehicle is unable to directly observe the lane markers or indicators at the second position. Instead, the vehicular vision system relies on the motion data to determine the shape or orientation and location of the lane markers or line indicators respective to the second position of the equipped vehicle.

The vehicular vision system, responsive to estimating the updated set of lane line geometries, determines blind spot zones of the equipped vehicle based on the updated set of lane line geometries. In some scenarios, the road the vehicle is traveling along is a curved road including multiple lanes. Thus, in these scenarios, the shape or curvature of the updated lane line geometries represents curved lanes and the determined blind spot zones include non-linear geometries (FIG. 5) based on the updated lane line geometries representing curved lanes.

Thus, the vehicular vision system or driving assist system determines lane curvature of traffic lanes of a road along which the vehicle is traveling and iteratively tracks or stores the curvature or shape of a section of the lanes as the vehicle travels along the road. Based on the determined geometry of a section of the lanes and based on the trajectory of the vehicle as the vehicle travels along the road, the system determines the location of the blind spot or blind zone at one or both sides of the vehicle at that time. Thus, at any given time after the geometry of lanes along any given section of the road is determined, the system can determine the geometry of the blind spot(s) rearward of the vehicle based on the determined geometry and the vehicle trajectory and the time that has elapsed following determination of the geometry of the lanes for that section of road. The system generates a moving blind spot shape that changes shape based on curvature of the road and vehicle motion and monitors that blind spot shape for other vehicles approaching or entering the blind spot shape.

The vehicular sensing system may process sensor data captured from radar or lidar sensors to detect whether another vehicle is present or approaching one of the determined blind zones. In some examples, the sensing system may determine a distance between another vehicle traveling along one of the traffic lanes and one of the blind spot zones. For example, the equipped vehicle may be traveling along a center lane of a curved road where another vehicle is following the equipped vehicle in an adjacent lane. Using the determined blind spot zones, the equipped vehicle may project a point onto the adjacent lane the other vehicle is traveling along and determine the distance between the other vehicle and the projected point. The projected point may correspond to one of the blind spots of the equipped vehicle. Notably, this distance may reflect the distance the other vehicle has to travel along the adjacent lane, which may be curved, rather than the shortest distance (e.g., a straight line) between the other vehicle and the projected point. Simply determining the shortest distance between the other vehicle and the projected point may only represent the actual distance the other vehicle has to travel to reach the blind spot of the equipped vehicle when the road is straight. Thus, when the road is curved, the shortest distance may not be an accurate representation of how far the other vehicle has to travel to reach the blind spot of the equipped vehicle as the other vehicle will likely travel along and within the curved adjacent lane rather than a straight line.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320, 176 and/or 7,480, 149, which are hereby incorporated herein by reference in their entireties, a vehicle vision system, such as a forward, sideward or rearward directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268; 7,370,983; 7,937,667 and/or 9,800, 983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354;

6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

The radar sensor or sensors may be disposed at the vehicle so as to sense exterior of the vehicle. For example, the radar sensor may comprise a front sensing radar sensor mounted at a grille or front bumper of the vehicle, such as for use with an automatic emergency braking system of the vehicle, an adaptive cruise control system of the vehicle, a collision avoidance system of the vehicle, etc., or the radar sensor may be comprise a corner radar sensor disposed at a front corner or rear corner of the vehicle, such as for use with a surround vision system of the vehicle, or the radar sensor may comprise a blind spot monitoring radars disposed at a rear fender of the vehicle for monitoring sideward/rearward of the vehicle for a blind spot monitoring and alert system of the vehicle.

Optionally, the radar sensor or sensors may be disposed within the vehicle so as to sense interior of the vehicle, such as for use with a cabin monitoring system of the vehicle or a driver monitoring system of the vehicle or an occupant detection or monitoring system of the vehicle. The radar sensing system may comprise multiple input multiple output (MIMO) radar sensors having multiple transmitting antennas and multiple receiving antennas.

The ECU may be operable to process data for at least one driving assist system of the vehicle. For example, the ECU may be operable to process data (such as image data captured by a forward viewing camera of the vehicle that views forward of the vehicle through the windshield of the vehicle) for at least one selected from the group consisting of (i) a headlamp control system of the vehicle, (ii) a pedestrian detection system of the vehicle, (iii) a traffic sign recognition system of the vehicle, (iv) a collision avoidance system of the vehicle, (v) an emergency braking system of the vehicle, (vi) a lane departure warning system of the vehicle, (vii) a lane keep assist system of the vehicle, (viii) a blind spot monitoring system of the vehicle and (ix) an adaptive cruise control system of the vehicle. Optionally, the ECU may also or otherwise process radar data captured by a radar sensor of the vehicle or other data captured by other sensors of the vehicle (such as other cameras or radar sensors or such as one or more lidar sensors of the vehicle). Optionally, the ECU may process captured data for an autonomous control system of the vehicle that controls steering and/or braking and/or accelerating of the vehicle as the vehicle travels along the road.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:

a forward-viewing camera disposed at a vehicle equipped with the vehicular sensing system and viewing at least forward of the equipped vehicle, the forward-viewing camera capturing image data;

wherein the forward-viewing camera comprises a CMOS imaging array, and wherein the CMOS imaging array comprises at least one million photosensors arranged in rows and columns;

an electronic control unit (ECU) comprising electronic circuitry and associated software;

wherein image data captured by the forward-viewing camera is transferred to the ECU;

wherein the electronic circuitry of the ECU comprises an image processor that is operable to process image data captured by the forward-viewing camera;

wherein the vehicular sensing system, responsive to processing at the ECU of image data captured by the forward-viewing camera at a first time, generates a first set of lane geometries representing curvature and location of a portion of at least one traffic lane of a road along which the equipped vehicle is traveling respective to a first position of the equipped vehicle at the first time, and wherein the portion of the at least one traffic lane is located forward of the equipped vehicle at the first position;

wherein the vehicular sensing system, via processing motion data representative of motion of the equipped vehicle traveling along the road after the first time, tracks the first set of lane geometries;

wherein the vehicular sensing system, based on processing of the motion data and the tracked first set of lane geometries, generates a second set of lane geometries representing curvature and location of the portion of the at least one traffic lane of the road respective to a second position of the equipped vehicle at a second time, and wherein the portion of the at least one traffic lane is located rearward of the equipped vehicle at the second position; and wherein the vehicular sensing system determines a blind zone of the equipped vehicle based on the generated second set of lane geometries.

2. The vehicular sensing system of claim 1, wherein the vehicular sensing system further comprises a radar sensor disposed at the equipped vehicle and sensing exterior of the equipped vehicle, and wherein the radar sensor is operable to capture radar data.

3. The vehicular sensing system of claim 2, wherein the vehicular sensing system, via processing radar data captured by the radar sensor, detects another vehicle present in the determined blind zone, and wherein the vehicular sensing system, responsive to detecting another vehicle present in the determined blind zone, generates an alert.

4. The vehicular sensing system of claim 2, wherein the vehicular sensing system, via processing radar data captured by the radar sensor, determines a speed that another vehicle is approaching the determined blind zone, and wherein the vehicular sensing system determines, responsive to determining a time until the other vehicle enters the blind zone is below a threshold, generates an alert.

5. The vehicular sensing system of claim 2, wherein the vehicular sensing system, via processing radar data captured by the radar sensor, determines a distance between another vehicle traveling along one of the at least one traffic lane and the determined blind zone, and wherein the determined blind zone is located in the one of the at least one traffic lane, and wherein the vehicular sensing system determines, responsive to determining that the distance between the other vehicle and the determined blind zone is below a threshold, generates an alert.

6. The vehicular sensing system of claim 5, wherein the one of the at least one traffic lane is a curved traffic lane, and wherein determining the distance between the other vehicle and the determined blind zone comprises projecting a point onto the tracked set of lane geometries corresponding to the curved traffic lane and determining a distance the other vehicle has to travel along the curved traffic lane to reach the projected point.

7. The vehicular sensing system of claim 5, wherein the distance between the other vehicle and the determined blind zone is not the shortest distance between the other vehicle and the determined blind zone.

8. The vehicular sensing system of claim 1, wherein the road the vehicle is traveling along is a curved road having multiple curved traffic lanes.

9. The vehicular sensing system of claim 1, wherein the determined blind zone comprises non-linear geometries.

10. The vehicular sensing system of claim 1, wherein the vehicular sensing system, responsive to tracking the set of lane geometries, overlays the tracked set of lane geometries onto a prior tracked set of lane geometries.

11. The vehicular sensing system of claim 10, wherein the vehicular sensing system, overlays the tracked set of lane geometries onto the prior tracked set of lane geometries by averaging the tracked set of lane geometries with the prior tracked set of lane geometries.

12. The vehicular sensing system of claim 11, wherein the vehicular sensing system averages the tracked set of lane geometries with the prior tracked set of lane geometries using a weighted average according to a filter parameter.

13. The vehicular sensing system of claim 1, wherein the portion of the at least one traffic lane is within a field of view of the forward-viewing camera with the equipped vehicle at the first position.

14. The vehicular sensing system of claim 1, wherein the portion of the at least one traffic lane is outside a field of view of the forward-viewing camera with the equipped vehicle at the second position.

15. The vehicular sensing system of claim 1, wherein the motion data representative of motion of the equipped vehicle is processed at the ECU.

16. A vehicular sensing system, the vehicular sensing system comprising:

a forward-viewing camera disposed at a vehicle equipped with the vehicular sensing system and viewing at least forward of the equipped vehicle, the forward-viewing camera capturing image data;

wherein the forward-viewing camera comprises a CMOS imaging array, and wherein the CMOS imaging array comprises at least one million photosensors arranged in rows and columns;

an electronic control unit (ECU) comprising electronic circuitry and associated software;

wherein image data captured by the forward-viewing camera is transferred to the ECU;

wherein the electronic circuitry of the ECU comprises an image processor that is operable to process image data captured by the forward-viewing camera;

wherein the vehicular sensing system, responsive to processing at the ECU of image data captured by the forward-viewing camera at a first time, generates a first set of lane geometries representing curvature and location of a portion of at least one traffic lane of a road along which the equipped vehicle is traveling respective to a first position of the equipped vehicle at the first time, and wherein the portion of the at least one traffic lane is located forward of the equipped vehicle at the first position, and wherein the portion of the at least one traffic lane is within a field of view of the forward-viewing camera with the equipped vehicle at the first position;

wherein the vehicular sensing system, via processing motion data representative of motion of the equipped vehicle traveling along the road after the first time, tracks the first set of lane geometries;

wherein the vehicular sensing system, based on processing of the motion data and the tracked first set of lane geometries, generates a second set of lane geometries representing curvature and location of the portion of the at least one traffic lane of the road respective to a second position of the equipped vehicle at a second time, and wherein the portion of the at least one traffic lane is located rearward of the equipped vehicle at the second position, and wherein the portion of the at least one traffic lane is outside the field of view of the forward-viewing camera with the equipped vehicle at the second position; and wherein the vehicular sensing system determines a blind zone of the equipped vehicle based on the generated second set of lane geometries.

17. The vehicular sensing system of claim 16, wherein the vehicular sensing system further comprises a radar sensor disposed at the equipped vehicle and sensing exterior of the equipped vehicle, and wherein the radar sensor is operable to capture radar data.

18. The vehicular sensing system of claim 17, wherein the vehicular sensing system, via processing radar data captured by the radar sensor, detects another vehicle present in the determined blind zone, and wherein the vehicular sensing system, responsive to detecting another vehicle present in the determined blind zone, generates an alert.

19. The vehicular sensing system of claim 17, wherein the vehicular sensing system, via processing radar data captured by the radar sensor, determines a speed that another vehicle is approaching the determined blind zone, and wherein the vehicular sensing system determines, responsive to determining a time until the other vehicle enters the blind zone is below a threshold, generates an alert.

20. The vehicular sensing system of claim 17, wherein the vehicular sensing system, via processing radar data captured by the radar sensor, determines a distance between another vehicle traveling along one of the at least one traffic lane and the determined blind zone, and wherein the determined blind zone is located in the one of the at least one traffic lane, and wherein the vehicular sensing system determines, responsive to determining that the distance between the other vehicle and the determined blind zone is below a threshold, generates an alert.

21. The vehicular sensing system of claim 20, wherein the one of the at least one traffic lane is a curved traffic lane, and wherein determining the distance between the other vehicle and the determined blind zone comprises projecting a point onto the tracked set of lane geometries corresponding to the curved traffic lane and determining a distance the other vehicle has to travel along the curved traffic lane to reach the projected point.

22. The vehicular sensing system of claim 20, wherein the distance between the other vehicle and the determined blind zone is not the shortest distance between the other vehicle and the determined blind zone.

23. The vehicular sensing system of claim 16, wherein the road the vehicle is traveling along is a curved road having multiple curved traffic lanes.

24. The vehicular sensing system of claim 16, wherein the determined blind zone comprises non-linear geometries.

25. A vehicular sensing system, the vehicular sensing system comprising:

a forward-viewing camera disposed at a vehicle equipped with the vehicular sensing system and viewing at least forward of the equipped vehicle, the forward-viewing camera capturing image data;

wherein the forward-viewing camera comprises a CMOS imaging array, and wherein the CMOS imaging array comprises at least one million photosensors arranged in rows and columns;

an electronic control unit (ECU) comprising electronic circuitry and associated software;

wherein image data captured by the forward-viewing camera is transferred to the ECU;

wherein the electronic circuitry of the ECU comprises an image processor that is operable to process image data captured by the forward-viewing camera;

a radar sensor disposed at the equipped vehicle and sensing exterior of the equipped vehicle, wherein the radar sensor is operable to capture radar data;

wherein the vehicular sensing system, responsive to processing at the ECU of image data captured by the forward-viewing camera at a first time, generates a first set of lane geometries representing curvature and location of a portion of at least one traffic lane of a road along which the equipped vehicle is traveling respective to a first position of the equipped vehicle at the first time, and wherein the portion of the at least one traffic lane is located forward of the equipped vehicle at the first position, and wherein the road the vehicle is traveling along is a curved road having multiple curved traffic lanes;

wherein the vehicular sensing system, via processing motion data representative of motion of the equipped vehicle traveling along the road after the first time, tracks the first set of lane geometries;

wherein the vehicular sensing system, based on processing of the motion data and the tracked first set of lane geometries, generates a second set of lane geometries representing curvature and location of the portion of the at least one traffic lane of the road respective to a second position of the equipped vehicle at a second time, and wherein the portion of the at least one traffic lane is located rearward of the equipped vehicle at the second position;

wherein the vehicular sensing system determines a blind zone of the equipped vehicle based on the generated second set of lane geometries;

wherein the vehicular sensing system, via processing radar data captured by the radar sensor, determines a distance between another vehicle traveling along one of the at least one traffic lane and the determined blind zone; and wherein the vehicular sensing system determines, responsive to determining that the distance between the other vehicle and the determined blind zone is below a threshold, generates an alert.

26. The vehicular sensing system of claim 25, wherein the vehicular sensing system, via processing radar data captured by the radar sensor, detects the other vehicle present in the determined blind zone, and wherein the vehicular sensing system, responsive to detecting another vehicle present in the determined blind zone, generates another alert.

27. The vehicular sensing system of claim 25, wherein the vehicular sensing system, via processing radar data captured by the radar sensor, determines a speed that the other vehicle is approaching the determined blind zone, and wherein the vehicular sensing system determines, responsive to determining a time until the other vehicle enters the blind zone is below a threshold, generates another alert.

28. The vehicular sensing system of claim 25, wherein the portion of the at least one traffic lane is outside a field of view of the forward-viewing camera with the equipped vehicle at the second position.

29. The vehicular sensing system of claim 25, wherein the motion data representative of motion of the equipped vehicle is processed at the ECU.

* * * * *